United States Patent [19]
Roberts

[11] 3,832,650
[45] Aug. 27, 1974

[54] SUPERSONIC CHEMICAL TRANSFER LASER

[75] Inventor: Thomas G. Roberts, Huntsville, Ala.

[73] Assignee: The United States of America as represented by the Secretary of the Army, Washington, D.C.

[22] Filed: Dec. 4, 1973

[21] Appl. No.: 421,569

[52] U.S. Cl. .................... 331/94.5 P, 331/94.5 G
[51] Int. Cl. .......................... H01s 3/09, H01s 3/22
[58] Field of Search ................... 331/94.5 P, 94.5 G

[56] References Cited
UNITED STATES PATENTS
3,760,294  9/1973  Roberts et al. ................ 331/94.5 P

*Primary Examiner*—John Kominski
*Assistant Examiner*—Darwin R. Hostetter
*Attorney, Agent, or Firm*—Edward J. Kelly; Herbert Berl; Herbert H. Murray

[57] ABSTRACT

A laser having a gas generating section that delivers a flow of high pressure high temperature gas which contains a large concentration of active fluorine atoms (F) to a nozzle. This gas is expanded through a nozzle to achieve low pressure low temperature supersonic flow which still contains the large concentration of the active atoms. The nozzle includes one set of injection ports positioned so as to inject cold carbon dioxide gas ($CO_2$) into the flow at a point in the nozzle where the flow is supersonic, just downstream of the throat; and another set positioned so as to inject deuterium ($D_2$) into the flow after the $CO_2$ has mixed with the fluorine containing flow, just at the nozzle exit plane. All gases exhaust from the nozzle into a lasing chamber wherein the energy of $F + D_2$ reaction which initially appears as vibrational energy in the product DF molecule is transferred in collisions to the $CO_2$ molecule. Thus producing a total inversion in the $CO_2$ which allows the energy to be extracted as a laser beam from the flow.

3 Claims, 3 Drawing Figures

SUPERSONIC CHEMICAL TRANSFER LASER

BACKGROUND OF THE INVENTION

The existing subsonic chemical transfer lasers operated by mixing $CO_2$ in the plenum where the active atoms are produced. This is possible because in the lasers the plenum pressure and temperature is not much different from the pressure and temperature in the optical cavity and the $CO_2$ does not chemically react with the active atom concentration. The other reactant in the desired reaction is then injected into this stream of active atoms and $CO_2$ at or near the beginning of the optical cavity. For example if the active atoms are fluorine (F) then deuterium or hydrogen may be injected at the optical cavity. In this case the reaction $F + D_2 \rightarrow DF^* + D$ produces $DF^*$ which is in an excited vibrational state, and since $CO_2$ is in the vicinity where the reaction takes place then the excited $DF^*$ transfers its vibrational energy to the upper laser level of $CO_2$ as follows:

$$DF^* + CO_2 \rightarrow CO_2^* + DF.$$

This is a resonant like collisional transfer similar to the transfer of vibrational energy from nitrogen to $CO_2$ in the gas dynamic lasers except that here the energy level match is not as close. In this manner a total population inversion is produced in the $CO_2$ whereas only a partial inversion is produced in the DF when $CO_2$ is not used, and since the $CO_2$ can be pumped by more than just one level of the excited $DF^*$ molecule, (it is not necessary for any type of inversion to exist in the DF molecules in order for an inversion to be produced in $CO_2$), more laser power per pound of flow can be obtained when these lasers are operated in the transfer mode. Additional advantages may be achieved if these transfer lasers are operated with supersonic flows in the cavity. Because of the more rapid removal of the waste energy much more power can be obtained and the cavity pressure may be raised to the point where these lasers may operate without auxiliary power supplies, and bulky, heavy equipment such as vacuum chambers, pumps, and compressors. But, to realize these advantages the plenum pressures and temperatures which must be used are such that the $CO_2$ can not be injected into the plenum where the active atoms are produced without reactions occuring which change the $CO_2$ to other compounds before it leaves the plenum. Because of this, when an attempt is made to operate the existing supersonic HF or DF chemical lasers as transfer chemical lasers, the $CO_2$ is injected along with the $H_2$ or $D_2$ into the supersonic flow from the plenum at the nozzle exit which is also where the optical cavity generally begins. This is usually done by mounting small needles along the leading edges of the nozzles and drilling small holes in these needles through which the $CO_2$ and $H_2$ are injected. However, in this configuration the laser does not function as a transfer chemical laser because the $H_2$ diffuses or mixes into the fluorine stream much faster than does the $CO_2$, and since there is no $CO_2$ near where the $F + H_2 \rightarrow HF^* + H$ reaction occurs the HF develops a partial inversion and lases before the energy can be transferred to the $CO_2$.

One might prevent this lasing by moving the mirrors of the optical cavity far enough downstream to give the $CO_2$ time to mix into the stream where the HF is located. But, during this time the temperature of the stream will rise due to the chemical reactions which are taking place and due to some collisional relaxation of the HF which is very fast compared to the collisional relaxation of the $CO_2$. Both of these effects will cause the power available for extraction in the laser beam to decrease and the laser will operate much less efficiently if at all.

A very good if not the best method for operating a supersonic chemical transfer laser would be to first freeze the fluorine from the plenum by rapid aerodynamic expansion to a temperature and pressure where $CO_2$ can be easily mixed into the flow. Then after a short time, say at the nozzle exit, the $D_2$ or $H_2$ can be injected. In this configuration $CO_2$ would be available in the supersonic stream when and where the excited $DF^*$ or HF8 is produced. Thus allowing the $CO_2$ to quench the HF or DF radiation and producing a total population inversion in the $CO_2$. In this configuration it would also be possible to inject $CO_2$ along with the $H_2$ or $D_2$ if this proves to be desirable.

SUMMARY OF THE INVENTION

The object of this invention is to provide a supersonic chemical transfer laser in which the molecule, say $CO_2$, to which the energy is to be transferred is made to be at the proper place at the proper time. The laser consists generally of a plenum or hot gas generating section for providing a fairly large concentration of active atoms, say Fluorine, and a nozzle section that receives the F from the generating section and expands it to a supersonic velocity which also causes the pressure, and the temperature to drop to low values. This expansion is produced in a time which is short compared to the recombination time of the F atoms so that the F atoms concentration produced in the plenum is essentially "frozen" or retained in the low pressure, low temperature supersonic flow. The nozzle section includes two sets of injection ports. One set which is connected to a source of $CO_2$ for injecting cold $CO_2$ into the supersonic flow from the plenum before it reaches the nozzle exit plane, and another set which is connected to a source of say $D_2$ for injecting this gas into the now mixed supersonic flow of F atoms and $CO_2$ when it reaches the nozzle exit plane. A lasing chamber or optical cavity is connected to the downstream side of the nozzle section and receives the exhaust therefrom. In the lasing chamber the $D_2$ stream mixes with the other stream and the flowing reaction occurs.

$F + D_2 \rightarrow DF^* + D$
$DF^* + CO_2 \rightarrow CO_2^* + DF$
$h\nu + CO_2^* \rightarrow 2h\nu + CO_2$

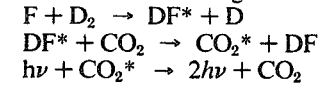

where $h\nu$ is a photon at 10.6 $\mu$. These photons consititute most of the radiation flux in the optical cavity of which a fraction $L_c$ is coupled out into the laser beam.

DETAILED DESCRIPTION OF THE INVENTION

Figure 1:
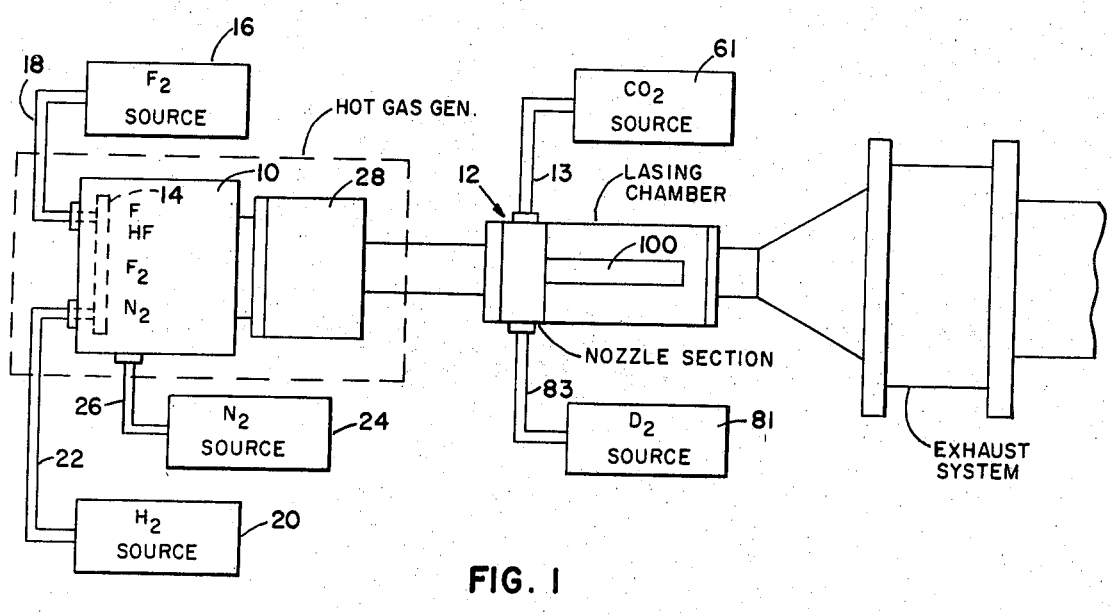
FIG. 1 is a schematic illustration of the laser device.

Referring to the drawings. In FIG. 1 the laser includes a hot gas generating section 10 that provides a flow which contains a relatively large concentration of F atoms to a nozzle section 12 mounted downstream. The gas generator 10 consists of a $H_2 + F_2$ burner 14 which is operated fluorine rich, however, other reactions could be used or hot $N_2$ from an electric arc or resistance heater could be used to dissociate the fluorine. Fluorine gas from a suitable source 16 is supplied through conduit 18 to the hot gas burner 14 where it is burned with hydrogen gas from a source 20 through conduit 22. A diluent such as $N_2$ is supplied to the generator chamber 10 from a source 24 through a conduit 26. Only part of the fluorine is burned and the energy released heats the gas mixture in the plenum to a thermal equilibrium condition where a large concentration of fluorine atoms exist prior to expansion through the nozzle section. The nozzle section 12 is mounted to a plenum 28 by bolting or other suitable means. The plenum 28 is connected to the hot gas generator 10.

Figure 2:
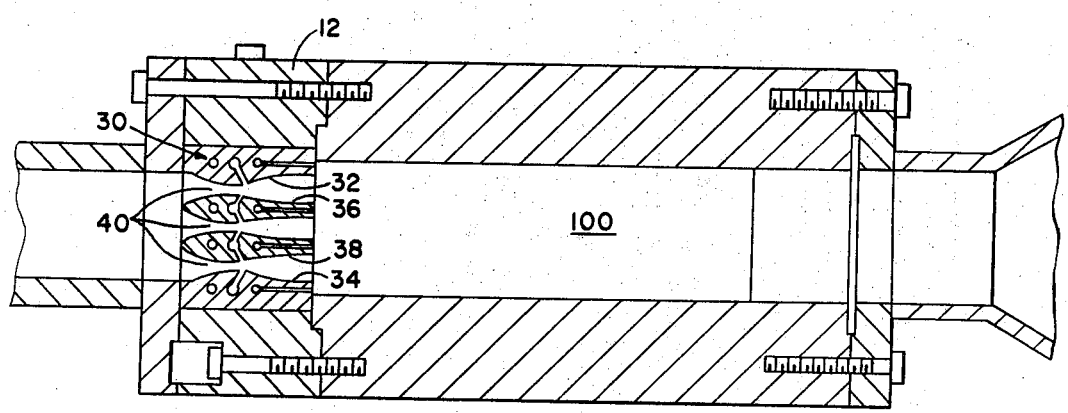
FIG. 2 is an enlarged cross sectional view of the nozzle section and lasing chamber.
Figure 3:
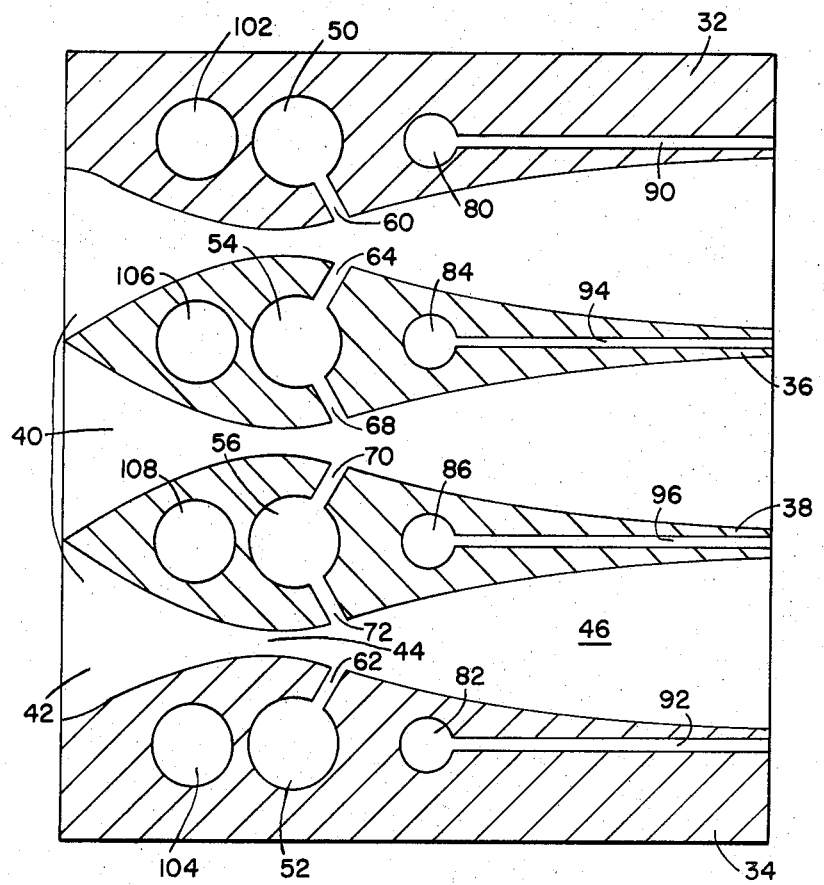
FIG. 3 is a cross-section of the nozzle piece illustrating the arrangement of the cooling water and gas passage ways and the injection ports.

The nozzle section as more clearly shown in FIGS. 2 and 3 comprises an elongated nozzle piece 30 that is made in four sections 32, 34, 36, and 38 that are stacked for use. When stacked the nozzle forms a plurality of elongated slits or channels 40 that form supersonic nozzles. (More nozzles than are shown may be used and it may be desirable to arrange the nozzles so that the channels run perpendicular to the direction shown.) Each channel, see FIG. 3, consists of a converging section 42 that joins a throat section 44 which is terminated by a diverging or exit section 46. The nozzles 32, 34, 36 and 38 are provided with passageways 50, 52, 54 and 56 respectively which supply $CO_2$ from source 61 through conduit 63 to ports 60, 64, 66, 68, 70 and 72 which introduce the $CO_2$ to the stream of gas flowing through the nozzles just downstream of the restricted zone thereof.

Similarly passageways 80, 82, 84 and 86 are provided in nozzles 32, 34, 36 and 38 respectively and are connected to the source of $D_2$ by conduit 83. The passageways 80, 82, 84 and 86 are connected by small passageways 90, 92, 94 and 96 respectively to the flow stream after it leaves the nozzle at the entrance to the lasing chamber or optical cavity 100.

A series of ports 102, 104, 106 and 108 in the nozzles 32, 34, 36 and 38 are connected to a circulating system for cooling water not shown.

There are as many injection ports used in each of the passageways as in consistent with the flow rates desired and construction capabilities. The fluorine and the $CO_2$ are thoroughly mixed in the remaining diverging portion of the nozzle before the $D_2$ is injected from its ports. As soon as the $D_2$ diffuses or mixes into the fluorine plus $CO_2$ flow the reactions as indicated above take place and lasing on the rotational-vibrational transitions of $CO_2$ develops.

The important thing is that there is a separeate place for injecting the $CO_2$ and the $D_2$ and that these are located in the proper locations. Although, the $F + D_2 \rightarrow DF^*$, $DF^* + CO_2 \rightarrow CO_2^* + DF$ reaction has been used as an illustration other transfers could just as well have been used, eq., $F + H_2 \rightarrow HF^* + H$, $HF^* + CO_2 \rightarrow CO_2^* + HF$; $Cl + HBr \rightarrow HCl^* + Br$, $HCl^* + CO_2 \rightarrow CO_2^* + HCl$; $F + D_2 \rightarrow DF^* + D$, $DF^* + N_2O \rightarrow N_2O^* + DF$, etc. It should also be pointed out that it is not necessary for the $D_2$ injectors to be built into the nozzles. These could be needles fastened to the leading edge of nozzles or the nozzles could be made in two sections with the $D_2$ injectors being located in the downstream section and the direction of the injected $D_2$ streams may be other than that shown.

I claim:

1. A supersonic chemical transfer laser comprising a gas generator chamber,
   a burner in said chamber,
   means for supplying fluorine and hydrogen to said burner to provide a fluorine rich mixture to said burner,
   a plenum chamber to provide intermixing of the products of combustion from said burner,
   a nozzle section for expanding the gases from said plenum chamber,
   means for supplying carbon dioxide to the gas flow through said nozzle just downstream from the throat of said nozzle,
   means for supplying deuterium to said gas flow downstream from the point at which the carbon dioxide is introduced,
   a lasing chamber attached to one end of said nozzle section, and
   means for exhausting the gases at the other end of said lasing chamber.

2. A supersonic chemical transfer laser as set forth in claim 1 wherein the point at which the deuterium is at the exit from said nozzles.

3. A supersonic chemical transfer laser as set forth in claim 2 wherein means are provided for introducing a neutral gas such as nitrogen to the combustion chamber to control the heat of the combustion gas products.

* * * * *